J. G. Ham,
Fertilizer Sower.

No. 93,434. Patented Aug. 10, 1869.

Witnesses.
O. Hinchman
Wm. T. Brooks

Inventor
J. G. Ham
per Mmm
Attorneys

United States Patent Office.

JOHN G. HAM, OF NEWNAN, GEORGIA.

Letters Patent No. 93,434, dated August 10, 1869.

IMPROVEMENT IN SEED AND MANURE-DROPPER.

The Schedule referred to in these Letters Patent and making part of the same.

*To all whom it may concern:*

Be it known that I, JOHN G. HAM, of Newnan, in the county of Coweta, and State of Georgia, have invented a new and improved Seed and Manure-Dropper; and I do hereby declare that the following is a full, clear, and exact description thereof, which will enable others skilled in the art to make and use the same, reference being had to the accompanying drawings, forming part of this specification.

The object of this invention is to provide a simple, cheap, and effective apparatus for dropping cotton-seed and finely-pulverized manures, such as guano and other fine manures of commerce.

The invention consists of a hopper, supported in front on a wheel, and in rear provided with two or more plows or cultivators and operating-handles, the said hopper being provided with an adjustable passage through the bottom, for delivering the seed or other matter, in which passage one or more saws are arranged and operated, to facilitate the feeding, all as hereinafter more fully specified.

Figure 1:
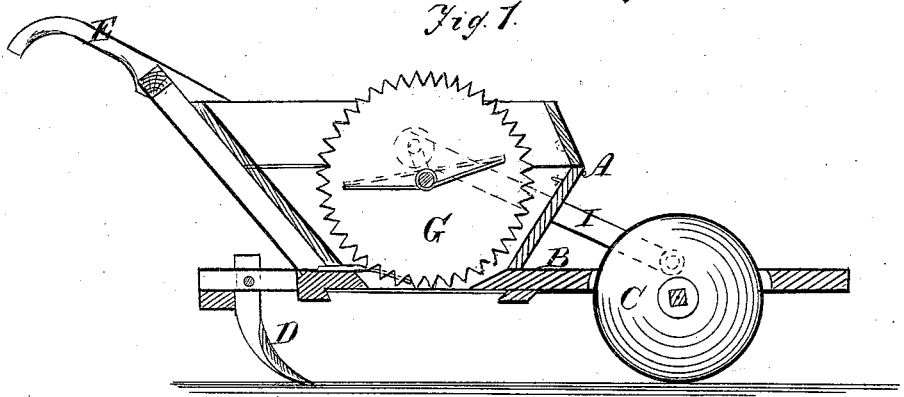
Figure 2:
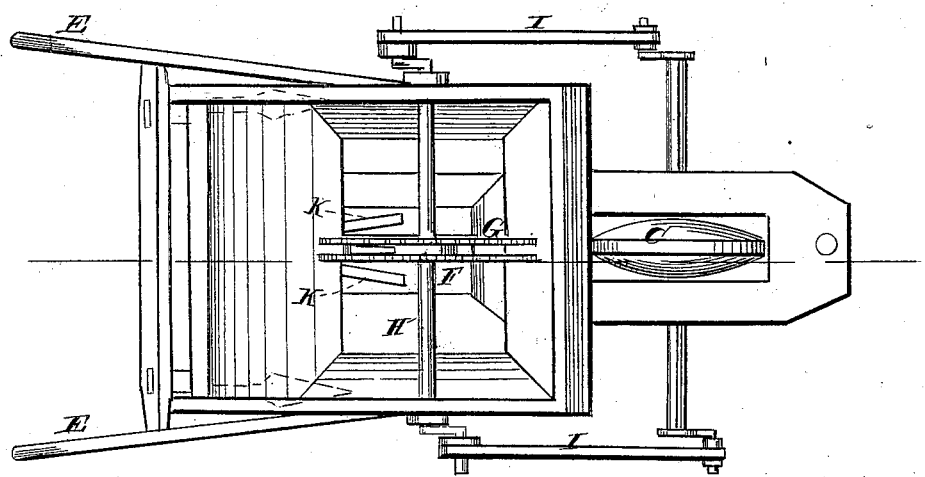

Figure 1 represents a longitudinal sectional elevation of my improved machine, and Figure 2 represents a plan view of the same.

Similar letters of reference indicate corresponding parts.

A represents a carrying and feeding-hopper, mounted on a frame, B, which is supported at the front on the axle of a wheel, C, calculated to roll along the ground, as the machine is drawn by hand or by animals.

The rear end of the frame, which extends some distance behind the hopper, is provided with two or more plows, D, arranged so as to be adjusted to or from each other. The said end is also provided with handles E.

The bottom of the hopper is provided with a passage for delivering the grain or other matter, which is supplied from time to time to the hopper.

This passage is provided with one or more adjustable gates, F, to vary the amount of the opening, for feeding faster or slower, as required.

For agitating the seed, and causing a regular and uniform feed, I provide, above the said passage, one or more saws, G, supported on an axle, H, running transversely of the hopper, and deriving rotary motion from the axle of the wheel C, by means of cranks thereon and connecting-rods I, connected to cranks on the said shaft.

These saws may be of any size, as preferred, and are designed to be so adjusted, that the teeth, in passing the bottom, will work in the mouth of the throat.

K represents fingers, or scrapers projecting from the inner base of the hopper over the passage, and on each side of the saws, to prevent the latter from carrying the seed and other matter upward, and thereby to cause a more perfect delivery.

The shaft H may be provided with spikes, to further agitate the contents of the hopper.

By this machine, cotton-seed and other matters difficult to feed regularly may be delivered in regulated quantities, with great accuracy, in rows, or drills, and at the same time be covered up by the plows, as will be clearly seen without further description.

Having thus described my invention,

I claim as new, and desire to secure by Letters Patent—

The saws G, arranged as described, in combination with the fingers K, adjustable gates F, and hopper A, as specified.

JOHN G. HAM.

Witnesses:
ANDREW J. SMITH,
JAMES H. GRAHAM.